United States Patent
Arabi et al.

(10) Patent No.: US 8,320,362 B2
(45) Date of Patent: Nov. 27, 2012

(54) TELECOMMUNICATIONS SYSTEM AND METHOD OF INITIATING FILE TRANSFERS FROM VOICE ENDPOINTS

(75) Inventors: Hamid Arabi, Boca Raton, FL (US); Faramarz F. Sahim, Boca Raton, FL (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1606 days.

(21) Appl. No.: 11/434,693

(22) Filed: May 16, 2006

(65) Prior Publication Data
US 2007/0288600 A1 Dec. 13, 2007

(51) Int. Cl.
*H04L 12/66* (2006.01)
(52) U.S. Cl. ........ 370/352; 370/356; 370/389; 370/282; 370/238; 709/219; 709/223
(58) Field of Classification Search .......... 370/352–356, 370/238, 389, 282; 709/219, 223
See application file for complete search history.

(56) References Cited

U.S. PATENT DOCUMENTS

| | | | |
|---|---|---|---|
| 6,990,081 B2 * | 1/2006 | Schaefer et al. | 370/260 |
| 7,231,658 B2 * | 6/2007 | Kunito et al. | 726/2 |
| 7,324,504 B2 * | 1/2008 | Park | 370/352 |
| 7,613,180 B2 * | 11/2009 | Tanaike et al. | 370/389 |
| 7,653,049 B2 * | 1/2010 | Kobayashi et al. | 370/352 |
| 2003/0115488 A1 * | 6/2003 | Kunito et al. | 713/201 |
| 2004/0030783 A1 * | 2/2004 | Hwang | 709/227 |
| 2006/0083171 A1 * | 4/2006 | Tanaike et al. | 370/238 |
| 2006/0153166 A1 * | 7/2006 | Kobayashi et al. | 370/352 |
| 2006/0274892 A1 * | 12/2006 | Izumi | 379/201.01 |
| 2009/0323558 A1 * | 12/2009 | Meenavalli | 370/259 |

FOREIGN PATENT DOCUMENTS

WO WO 9624215 8/1996

OTHER PUBLICATIONS

PCT ISR Nov. 13, 2007.
"A Mechanism to Enable File Transfer with the Session Initiation Protocol (SIP); . . . " IETF Feb. 23, 2006.
"SIP Telephony Device Requirements, Configuration and Data . . . " IETF Feb. 21, 2002.
"Data protocols for multimedia conferencing; T.120 (Jul. 1996)" ITU Jul. 1, 1996.

* cited by examiner

*Primary Examiner* — Asad Nawaz
*Assistant Examiner* — Khaled Kassim

(57) ABSTRACT

A communications system and method of transferring data over the communications system. The system includes audio communications devices (telephones and/or, soft phones) connected to Session Initiation Protocol (SIP) endpoints with multiple line capabilities and a unique Uniform Resource Identifier (URI) associated with audio communications that has the form x@y.z. A file transfer agent system running a File Transfer Application Agent (FTAA) application is also connected at each of SIP endpoints, and has a unique URI that has the form ft.x@y.z. Parties conducting a phone conversation at SIP endpoints can initiate file transfers between the file transfer agent system from respective audio communications devices without otherwise accessing the file transfer agent system.

21 Claims, 3 Drawing Sheets

TELECOMMUNICATIONS SYSTEM AND METHOD OF INITIATING FILE TRANSFERS FROM VOICE ENDPOINTS

BACKGROUND OF THE INVENTION

1. Field of the Invention

The present invention is related to telecommunications systems and more particularly, to transferring data files over digital telecommunications networks.

2. Background Description

Commercial telecommunications platforms have allowed service providers to deliver Internet Protocol (IP) based telecommunications services. Typical such IP telecommunications services feature common channel telecommunications packet switching capabilities, such as Signaling System Number 7 (SS7) signaling capabilities. These capabilities allow for legacy feature support and, further, interconnection with Public Switched Telephone Networks (PSTN). Digital communications such as Voice over IP (VoIP), for example, normally use Session Initiation Protocol (SIP) protocol for establishing and clearing of connections between network stations. VoIP calls using SIP protocol work well for a relatively simple connection with simple user control, e.g., using a typical user interface.

Frequently, parties engaged in such a VoIP call may find it necessary for one party to pass data (e.g., stored on a local computer) to the other party. For example, a project manager may wish to pass employees project information, e.g., locally stored sensitive project data. If the manager feels that the information is too sensitive for e-mail because, for example, it may reside on a server somewhere for some period of time before it is downloaded; then it may be necessary to contact the recipients and find some more secure means of transfer. Once the recipients are contacted, e.g., by a VoIP call, the data can be passed with reasonable certainty that the intended recipient is actually receiving it. So, provided the parties have access to computers at both ends, after placing the call, they can establish a file transfer session and transfer the data, e.g., from the manager's computer to the employees. After the transfer, the parties can verify that the data passed safely, e.g., by a second telephone call.

Unfortunately, however, such a transfer requires that both parties have access to their computers, that any data transfer occurs independently of the personal contact and, that only after the transfer can either party determine/verify that a valid transfer took place. If either party cannot access their respective computer, the transfer cannot be made. Also, ending the call and setting up the transfer is time consuming and, potentially, problematic. If, for example, the originating party enters the wrong address for the destination, only after the files are transferred to the wrong location is either party notified.

Thus, there is a need for a seamless way to safely transfer files among the parties involved in a SIP voice call and, especially, where either or both of the parties, initiating the file transfers and the recipients of the transferred files, are not required to have access to their respective computers during the entire file transfer.

SUMMARY OF THE INVENTION

It is a purpose of the invention to initiate file transfers between recipients that may or may not have access to a computer during the entire file transfer process;

It is another purpose of the invention to simply transfer files among parties involved in Session Initiation Protocol (SIP) voice calls without entering IP addresses of devices involved in the file transfers.

The present invention relates to a communications system and method of transferring data over the communications system. The system includes audio communications devices (telephones and/or, soft phones) connected to Session Initiation Protocol (SIP) endpoints with multiple line capabilities and a unique Uniform Resource Identifier (URI) associated with audio communications that has the form x@y.z. A file transfer agent system running a File Transfer Application Agent (FTAA) application is also connected at each of SIP endpoints, and has a unique URI that has the form ft.x@y.z. Parties conducting a phone conversation at SIP endpoints can initiate file transfers between the file transfer agent system from respective audio communications devices without otherwise accessing the file transfer agent system.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
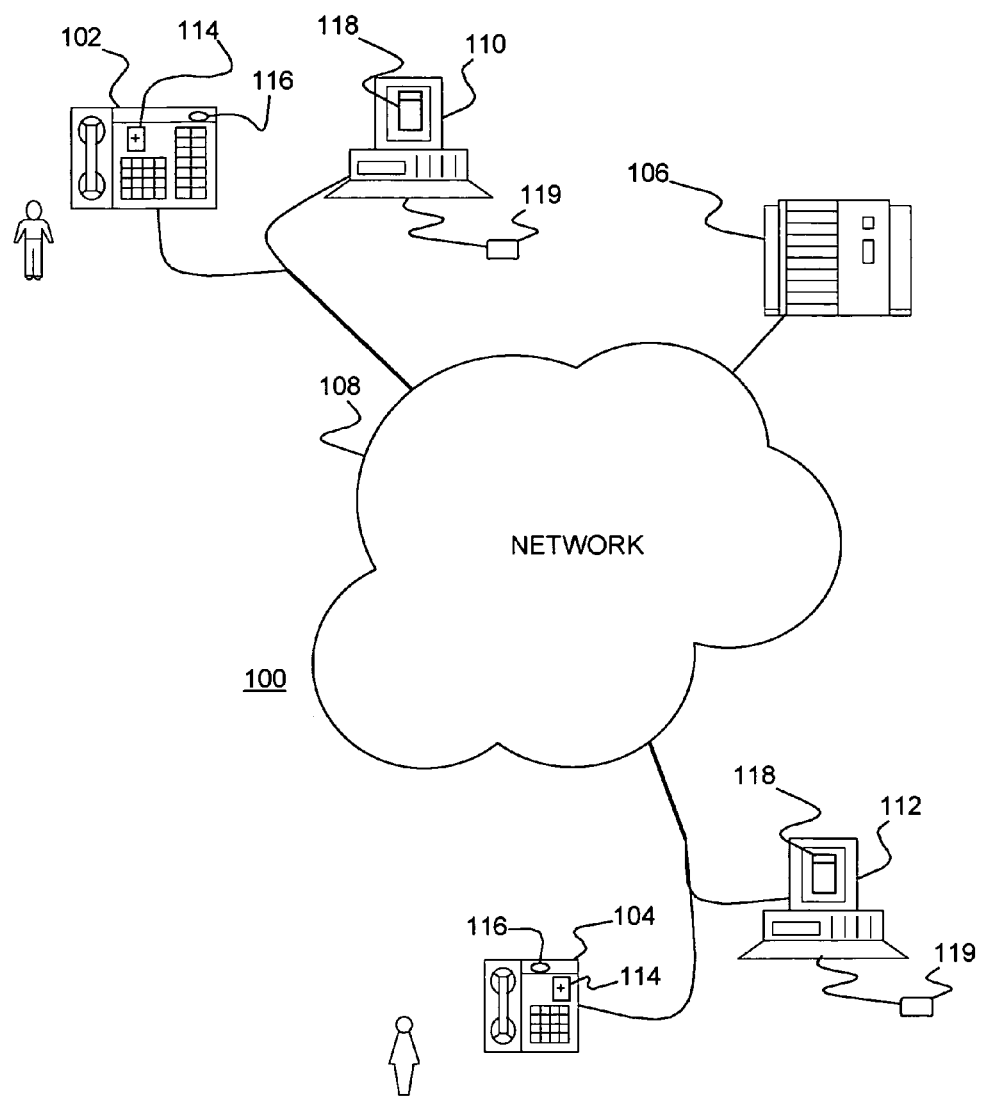
FIG. 1 shows an example of a communications system including Session Initiation Protocol (SIP) endpoints capable of transferring files between the endpoints according to a preferred embodiment of the present invention.

Turning now to the drawings and more particularly, FIG. 1 shows an example of a preferred Session Initiation Protocol (SIP) based system 100 including SIP endpoints 102, 104, some of which have multiple line capabilities. The SIP endpoints 102, 104 may be any suitable audio communications devices, such as telephones and/or, soft phones that are connected for voice communications and may be connected to one or more appropriate SIP server(s) 106 (e.g., a registrar server, a location server, a redirect server, a proxy server and/or a presence server) over a network 108, e.g., the Internet, the public switched telephone network/public land mobile network (PSTN/PLMN) or a 3rd Generation Partnership Project (3GPP) wireless network. Also, a station 110, 112 acting as a file transfer agent system is connected to one of the lines at each of the SIP endpoints 102, 104, respectively.

Thus, according to a preferred embodiment of the present invention, users carrying on conversations over the SIP endpoints 102, 104 can initiate remote file transfers to each other between respective file transfer agent systems 110, 112. Further, the file transfer may be initiated from the SIP endpoints 102, 104 without either user directly accessing the file transfer agent systems 110, 112. So, the SIP endpoints 102, 104 can be at separate geographical locations from each respective file transfer agent systems 110, 112. Each file transfer agent system 110, 112 may be, for example, a personal computer (PC), running a File Transfer Application Agent (FTAA) application. The FTAA application may be stored in any suitable non-transitory computer-readable medium that when loaded into a computer, e.g., a PC, the PC operates as a file transfer agent system 110, 112. So, each SIP endpoint 102, 104 passes commands to a respective transfer agent system 110, 112. The FTAA locates pre-selected files and manages the transfer.

So for example, voice communications at each of the SIP endpoints 102, 104, may be associated with a unique Uniform Resource Identifier (URI) of the form 102x@y.z, 104x@y.z. Similarly, the file transfer agent systems 110, 112 are configured with a special URI that has the format ft.102x@y.z, ft.104x@y.z. The FTAA provides the file transfer agents 110, 112 with a number of special capabilities in addition to SIP capabilities. During a normal voice conversation, for example, the respective file transfer agent 110, 112 can search a configured subset of files in the computer file system for files that may be transferred. Also, a voice user can select those files from a respective SIP endpoint 102, 104 through SIP audio or a computer user interface. Preferably, to provide for selecting these files, the SIP endpoints 102, 104 may include additional phone keys 114 that are also configured as SIP endpoints to act as next/previous/select functions. The URI of each of these endpoints is next.102x@y.z/ previous.102x@y.z/select.102x@y.z, and next.104x@y.z/ previous.104x@y.z/select.104x@y.z, respectively. Also, each SIP endpoint 102, 104 may include a file transfer indicator 116. Each transfer agent system 110, 112 may include a file selection window 118 and mouse 119.

Activating an appropriate key on each of these endpoints initiates a SIP call to the FTAA. The respective file transfer agent system 110, 112 answers the call to start the transfer process and, immediately, releases the SIP call. Similarly, once the file transfer is complete, the respective file transfer agent system 110, 112 releases SIP call related resources.

Figure 2:
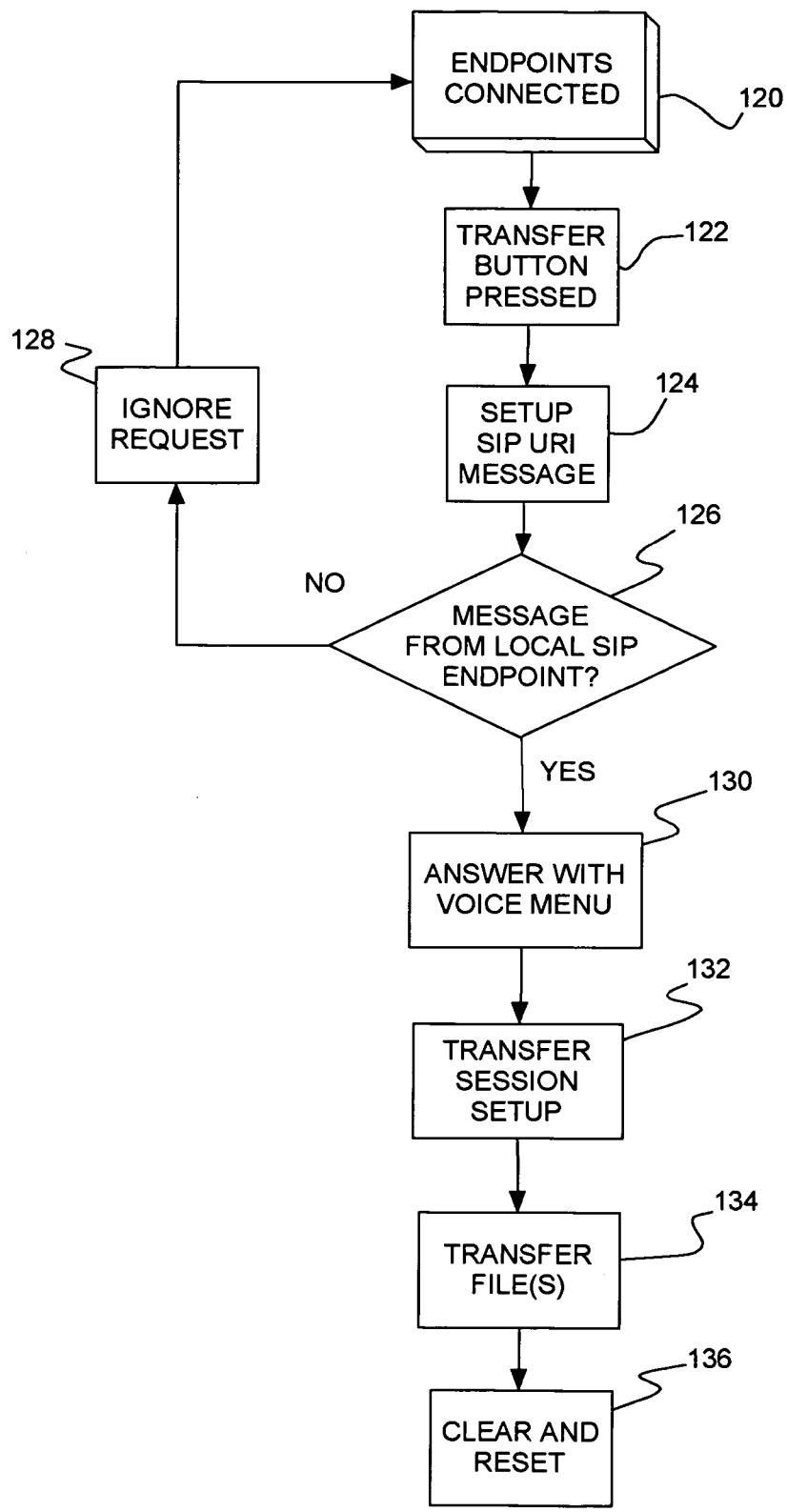
FIG. 2 shows an example of initiating file transfer between SIP endpoints.

FIG. 2 shows an example of initiating file transfer, e.g., between SIP endpoints 102, 104 in FIG. 1, according to a preferred embodiment of the present invention. A file transfer begins after SIP endpoints 102, 104 are engaged in a voice conversation in 120, where, typically, the users agree to the file transfer. So, in step 122 one user presses the transfer button on one SIP endpoint, e.g., 102, to initiate the transfer, which places that initiating SIP endpoint 102 on hold. Then, in step 124 the FTAA sets up a message in the associated file transfer agent system 110 that contains the SIP URI for the other, destination SIP endpoint 104. So, for example, initiating endpoint 102 uses the special SIP URI to initiate a SIP call to the FTAA in the associated file transfer agent system 110. The initiating SIP endpoint 102 also passes the SIP URI for the other, destination SIP endpoint 104 to the FTAA. Next in step 126, the FTAA in the file transfer agent 110 verifies that the call is from SIP endpoint 102. If the call is not from SIP endpoint 102 the file transfer agent system 110 ignores the message in step 128 and the call continues normally. Otherwise in step 130, the file transfer agent system 110 answers the call and the FTAA presents an audible menu to SIP initiating endpoint 102 to allow the endpoint user to select a file or files for transfer. Thereafter, in step 132, the FTAA in the file transfer agent system 110 sets up the rest of the file transfer session as explained in further detail hereinbelow. In step 134, the file transfer agent system 110 transfers the selected file(s) to the destination file transfer agent system 112. In step 136 when the file transfer is complete, the FTAA in each file transfer agent system 110, 112 clears the file transfer related calls, which turns off a file transfer indications, e.g., button LED's on SIP endpoints 102, 104.

In step 130, if the call is being placed through the voice interface in SIP endpoint 102, then for example, the audible menu presented in step 130 may begin with the message "Please press select to choose computer or next for more options." If nothing is entered in the respective SIP endpoint 102 within a set time period, then the file transfer agent 110 uses a default response. Likewise, if the "next" button is pressed to select the same response, the audio menu plays the message "for audio press select or press previous." If the "select" button is chosen, the file transfer agent 110 enters file transfer selection mode. In file transfer selection mode an audible list of transferable files are presented that can be traversed using the next/previous/select keys 114 to navigate and select one or more files.

If however, in step 130, the call is being placed through the computer interface in SIP endpoint 102, then for example, the audible menu presented in step 130 may begin with the message "Please press select to choose computer or next for more options." Again, if nothing is entered in the respective SIP endpoint 102 within a set time period, then the file transfer agent 110 uses a default response. Likewise, if the "select" button is chosen to select the same response, the file transfer agent 110 enters file transfer selection mode and the file transfer agent 110 presents a file selection window. Files are then selected from the file selection menu 118 using a suitable input device, e.g., using the mouse 119.

Figure 3:
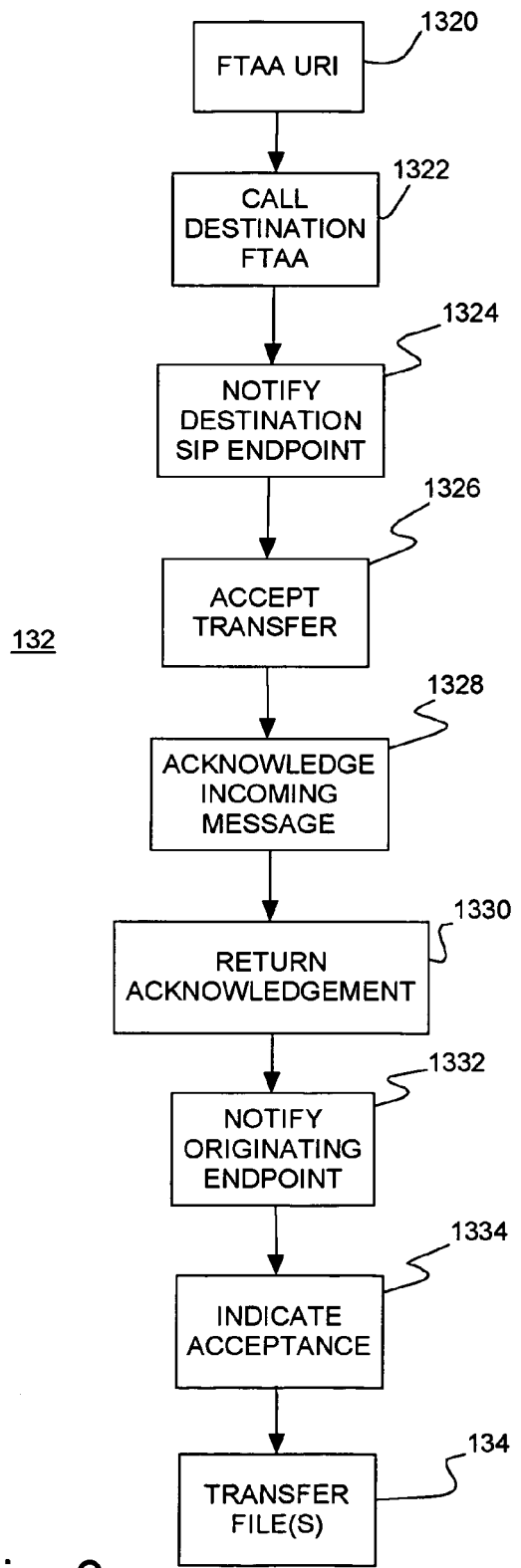
FIG. 3 shows an example of operation in the file transfer agent of the FTAA application in setting up the file transfer session.

FIG. 3 shows an example of operation of the FTAA application in setting up the file transfer session in step 132 in the file transfer agent system. After selecting the files for transfer, in step 1320 the file transfer agent (e.g., 110 in FIG. 1) constructs the SIP address of the destination file transfer agent 112 from the destination SIP endpoint 104. So, in this example, the constructed address is ft.104x@y.z. In step 1322 the originating file transfer agent system 110 calls the destination file transfer agent system 112 using the constructed address. Upon receiving the call, in step 1324 the destination file transfer agent system 112 sends a setup message to the destination SIP endpoint 104. The destination SIP endpoint 104 provides an indication of an incoming file transfer request from SIP endpoint 102, e.g., blinking indicator 116. In step 1326 a user at the destination SIP endpoint 104 acknowledges the file transfer and indicates acceptance by pressing a file transfer button or sequence of buttons, e.g., #*#. The destination SIP endpoint 104 acknowledges acceptance to file transfer agent system 112 in step 1328 and in step 1330, the destination file transfer agent system 112 forwards that acknowledgement to the originating file transfer agent system 110. In step 1332, the originating file transfer agent system 110 forwards the acknowledgement to SIP endpoint 102, and in step 1334 the user at SIP endpoint 102 is notified that the destination has accepted the request for transfer, e.g., by a tone, verbal message or flashing indicator 116. Finally, in step 134, the file transfer agent system 110 transfers the selected file(s) to other SIP endpoint 104 file transfer destination, i.e., file transfer agent system 112.

Advantageously, the present invention provides a communications system for transferring files between the parties involved in a SIP voice call with the push of a button on the SIP phone. The transfers can be made regardless of whether the parties have access to their computers during the entire file transfer process. Further, both the party initiating the file transfer and the recipient(s) can transfer the file(s) without even knowing, much less entering, the IP addresses of devices involved in the file transfer.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A communications system comprising:
a first SIP endpoint having multiple line capabilities;
a second SIP endpoint having multiple line capabilities and a unique Uniform Resource Identifier (URI);
a first file transfer agent system associated with the first SIP endpoint; and
a second file transfer agent system associated with the second SIP endpoint; and
wherein a user of the first SIP endpoint is in voice communication with a user of the second SIP endpoint; and
wherein the first SIP endpoint initiates a call to the first file transfer agent system, the call comprising the unique URI; and
wherein the first file transfer agent system answers the call and presents an audio menu to the user of the first SIP endpoint;
wherein the voice communication is held; and
wherein the user of the first SIP endpoint responds to the audio menu by selecting at least one file to transfer to the second SIP endpoint; and
wherein the first file transfer agent system transfers the selected at least one file to the second file transfer agent system by a transfer process comprising:
the first file transfer agent system constructing an SIP address for the second file transfer agent system using the unique URI of the second SIP endpoint,
the first file transfer agent system calling the second file transfer agent system using the constructed SIP address,
the second file transfer agent system receiving the call and sending a setup message to the second SIP endpoint, the setup message comprising a file transfer request,
the second SIP endpoint providing an indication in response to the setup message accepting the file transfer request,
the second file transfer agent system forwarding the acceptance to the first file transfer agent system, and
the first file transfer agent system notifying the user of the first SIP endpoint that the second SIP endpoint accepted the file transfer request, and
wherein the first file transfer agent system transfers the at least one selected file to the second file transfer agent system after receiving the forwarded acceptance from the second file transfer agent; and
wherein the unique URI is independent of an IP address of the second SIP endpoint.

2. The communications system of claim 1 wherein the first SIP endpoint has a file transfer button and the call from the first SIP endpoint is initiated by pressing the file transfer button.

3. The communications system of claim 1 wherein the first file transfer agent system is located at a separate geographical location from the first SIP endpoint and the second file transfer agent system is located at a separate geographical location from the second SIP endpoint.

4. The communications system of claim 1 wherein the first file transfer agent system receives the call from the first SIP endpoint and upon starting to transfer files, the first file transfer agent system releases the call.

5. The communications system of claim 1 wherein the first SIP endpoint has a plurality of keys for selecting files to transfer, and wherein the user of the first SIP endpoint responds to the audio menu by pressing at least one of the keys.

6. The communications system of claim 1 wherein the first transfer agent system verifies that the call is from an SIP endpoint, and if the call is from an SIP endpoint then the first transfer agent system answers the call.

7. The communications system of claim 5 wherein one of the plurality of keys comprises a select key and the first file transfer agent system presents an audible list of transferable files after the select key is depressed.

8. The communications system of claim 1 wherein the voice communication between the user of the first SIP endpoint and the user of the second SIP endpoint is an ongoing call between the first SIP and the second SIP endpoints in which voice data is transmitted via the ongoing call and wherein the ongoing call is placed on hold when the call to the first file transfer agent system is initiated by the first SIP endpoint.

9. The communication system of claim 3 wherein the first file transfer agent system comprises a computer running a File Transfer Application Agent (FTAA) and the second file transfer agent system comprises a computer running a FTAA wherein each of the FTAAs manage transfer of the selected at least one file.

10. The communication system of claim 1 wherein the first file transfer agent system releases SIP call related resources following transfer of the selected at least one file to the second file transfer agent system.

11. A method of transferring files comprising:
connecting a first SIP endpoint and a second SIP endpoint in a voice communication;
holding the voice communication;
initiating a call from the first SIP endpoint to a first file transfer agent system associated with the first SIP endpoint, the call comprising a unique Uniform Resource Identifier (URI) for the second SIP endpoint;
answering the call by the first file transfer agent system upon verifying that the call is from an SIP endpoint;
presenting an audio menu to a user of the first SIP endpoint;
the user of the first SIP endpoint responding to the audio menu by selecting one or more files to transfer to the second SIP endpoint; and
the first file transfer agent system transferring the selected files to a second file transfer agent system associated with the second SIP endpoint, the transferring of the one or more selected files comprising:
the first file transfer agent system constructing an SIP address for the second file transfer agent system using the unique URI for the second SIP endpoint,
the first file transfer agent system calling the second file transfer agent system using the constructed SIP address,
the second file transfer agent system receiving the call and sending a setup message to the second SIP endpoint, the setup message comprising a file transfer request,
the second SIP endpoint providing an indication in response to the setup message accepting the file transfer request,
the second file transfer agent system forwarding the acceptance to the first file transfer agent system, and
the first file transfer agent system notifying the user of the first SIP endpoint that the second SIP endpoint accepted the file transfer request, and
wherein the first file transfer agent system transferring of the selected one or more files to the second file transfer agent system occurs after receiving the forwarded acceptance from the second file transfer agent; and wherein the unique URI for the second SIP endpoint is independent of an IP address of the second SIP endpoint.

12. The method of transferring files of claim 11 wherein initiating the call from the first SIP endpoint to the first file transfer agent system comprises pressing a file transfer button on the first SIP endpoint.

13. The method of transferring files of claim 11 wherein the first file transfer agent system is located at a separate geographical location from the first SIP endpoint and the second file transfer agent system is located at a separate geographical location from the second SIP endpoint.

14. The method of transferring files of claim 11 wherein the user of the first SIP endpoint responding to the audio menu comprises the user of the first SIP endpoint pressing at least one of a plurality of keys on the first SIP endpoint for selecting files to transfer.

15. The method of transferring files of claim 14 wherein one of the plurality of keys comprises a select key and the method further comprising depressing the select key and the first file transfer agent system presenting an audible list of transferable files to the user of the first SIP endpoint.

16. The method of transferring files of claim 13 wherein the first file transfer agent system comprises a computer running a File Transfer Application Agent (FTAA) and the second file transfer agent system comprises a computer running a FTAA, and wherein each of the FTAAs manage the transferring of the one or more selected files.

17. The method of transferring files of claim 15 wherein the plurality of keys further comprising a next key and a previous key for selecting files to be transferred.

18. A method of transferring files comprising:
connecting a first SIP endpoint and a second SIP endpoint in a voice communication;
the first SIP endpoint initiating an SIP call to a File Transfer Application Agent (FTAA) of a first file transfer agent system associated with the first SIP endpoint, the SIP call comprising a unique Uniform Resource Identifier (URI) for the second SIP endpoint;
verifying whether the SIP call is from an SIP endpoint by the FTAA;
upon verifying that the SIP call is from an SIP endpoint, the first file transfer agent system answering the SIP call by the first file transfer agent system and the first file transfer agent system presenting an audible menu to a user of the first SIP endpoint;
holding the voice communication; and
transferring one or more files that are selected by a user of the first SIP endpoint to a second file transfer agent system associated with the second SIP endpoint;
the transferring of the one or more files comprising:
the first file transfer agent system constructing an SIP address for the second file transfer agent system using the unique URI of the second SIP endpoint,
the first file transfer agent system calling the second file transfer agent system using the constructed SIP address,
the second file transfer agent system receiving the call and sending a setup message to the second SIP endpoint, the setup message comprising a file transfer request,
the second SIP endpoint providing an indication in response to the setup message accepting the file transfer request,
the second file transfer agent system forwarding the acceptance to the first file transfer agent system, and
the first file transfer agent system notifying the user of the first SIP endpoint that the second SIP endpoint accepted the file transfer request, and
wherein the first file transfer agent system transferring the selected files to the second file transfer agent system occurs after receiving the forwarded acceptance from the second file transfer agent.

19. The method of transferring files of claim 18 wherein upon starting to transfer the one or more files, the first file transfer agent system releases the call from the first SIP endpoint.

20. The method of transferring files of claim 19 further comprising the first file transfer agent system releasing SIP call related resources following the transferring of the selected files to the second file transfer agent system.

21. The method of transferring files of claim 18 wherein a user of the second SIP endpoint accepts the file transfer request by pressing a button on the second SIP endpoint.

* * * * *